United States Patent Office 3,148,191
Patented Sept. 8, 1964

3,148,191
PROCESS FOR PREPARING QUINACRIDONE PIGMENTS
Julius Jackson, Westfield, and William J. Marshall, Scotch Plains, N.J., assignors to E. I. du Pont de Nemours and Company, Wilmington, Del., a corporation of Delaware
No Drawing. Filed Nov. 2, 1962, Ser. No. 235,140
10 Claims. (Cl. 260—279)

This invention relates to improved processes for reducing the particle size of quinacridone pigments, and is more particularly directed to the steps in such a process comprising (1) milling the quinacridone with anhydrous aluminum chloride whereby a complex compound of the quinacridone with the aluminum chloride is formed, (2) regenerating the quinacridone in small particle size from the complex compound by mixing said compound with a liquid electron-donor solvent, whereby reaction occurs between the compound and solvent with liberation of the quinacridone, (3) separating water-soluble constituents from the quinacridone by washing them out with water, and (4) recovering the quinacridone. Optionally, the milling step can be carried out with an inert diluent present. This can be a crystalline solid, an inert liquid, or a mixture of both.

Inert inorganic salts have already been used as grinding aids in milling operations for particle size reduction of quinacridones. In U.S. Patent 2,844,484, for instance, it is shown to mill with an inorganic salt such as NaCl. More recently U.S. Patent 3,030,370 has disclosed the use of hydrated aluminum sulfate as the inorganic salt to be used in such a process, and has stressed the undesirability of anhydrous aluminum salts as the sole grinding aids.

Organic liquids have already been used as phase-directing solvents in quinacridone-grinding processes. In U.S. Patent 2,844,485, for example, a small amount of a solvent such as xylene is added to promote a crystal phase transformation, while a different solvent is used in U.S. Patent 2,844,581 to obtain still another phase.

There have, however, been apparent limits on the tinctorial properties of products made by the prior art processes. One important use of the violet shade beta phase quinacridone of U.S. Patent 2,844,485 has been in blends with certain red-to-orange pigments to achieve brilliant dark red finishes of superior durability. To achieve maximum intensity in such blends, there has been required a degree of blueness and strength in the beta phase quinacridone not readily heretofore obtainable.

Another important deficiency of quinacridones made by many prior art processes has been their relatively poor dispersibility in the vehicles of coating compositions and in many plastic compositions.

An important factor in the economics of a ball milling operation is the ease and completeness of the discharge of the mill powder from the mill. Unfortunately, processes using sodium chloride or ammonium sulfate as the inert milling aid have been especially deficient in this regard, the mills frequently retaining very persistently more than 10% of the solids charged to the mill.

Because of the above-mentioned and other deficiencies there has been a need for processes which give products having more desirable tinctorial properties and better dispersibility, and which permit shorter milling cycles and more complete discharge of the mill powder from the mill. Now according to the present invention this need is met, and a reliable and economical method of controlling the crystal phase of small-particle-size quinacridone pigment is provided, by processes in which a quinacridone is milled with anhydrous aluminum chloride to form a complex compound, the quinacridone is regenerated in small particle size by mixing the complex compound with a liquid electron-donor solvent, water-soluble constituents are washed out of the mixture with water, and the quinacridone is recovered as a powder pigment.

THE MILLING STEP

All aspects of the invention have the milling step in common. The conditions of milling are not critical, being substantially those shown in the prior art. It is preferred that it be done in a ball mill about ½ to ⅔ full of the combined charge of pigment, inert diluent where present, and milling aids, usually being rotated at about 70% of critical speed (the speed at which the charge is held to the outside surface by centrifugal force). The grinding aids are preferably relatively large objects such as ½" diameter (or larger) steel balls or steel rods (say about ½" x 1"). The presence of some larger irregular objects, such as large nails, often assists in preventing packing in the mill. The charge of grinding aids is usually sufficient to fill the mill to about 40–50% capacity. The actual weight will, of course, vary with the size of the mill.

The time of milling can vary widely. With mills of 50 gals, or larger it usually requires from 4 to 6 hours to obtain the desired results and longer cycles are frequently used. It is characteristic of unsubstituted quinacridone to tend to convert to the alpha phase on prolonged milling and this tendency is accelerated to some degree by the presence of aluminum chloride. The introduction of a small amount of a selected solvent tends to prevent this change and to retain the pigment in the same phase as the original crude quinacridone. It is obvious, therefore, that a balance can be struck in the particle size reduction of beta phase quinacridone, for instance, between the pronounced violet hue of the relatively pure beta phase at about 6 hours' milling and an increasing tendency to turn more yellow with the formation of some alpha phase as milling is extended to 10 hours. With the understanding of the applicable principles, this becomes a useful variable within the inventive process of using $AlCl_3$ in the mill.

The temperature of milling is usually limited to a maximum of about 60–70° C. However, this is not critical except to avoid volatilization if any liquid present, with the accompanying accumulation of pressure.

In the broadest aspect of this invention the dry quinacridone pigment and the anhydrous aluminum chloride are milled together in a ball mill to form at least a partial quinacridone-$AlCl_3$ complex. In such a process the amount of aluminum chloride may vary upward from about 25% the weight of the pigment. Amounts in excess of about 75% of the weight of the pigment offer no advantage.

In another aspect, the invention is an improvement over the well-known process for particle size reduction of quinacridone by milling in the presence of an inert salt. The addition of anhydrous $AlCl_3$ to such a system requires that the other ingredients also be essentially dry and inert to the $AlCl_3$. This precludes the use of hydrated aluminum sulfate as taught by U.S. Patent 3,030,370 as well as alkaline salts such as sodium carbonate and the like. Both sodium chloride and ammonium sulfate are well adapted as inert salts. For reasons that are not at all clear, aluminum chloride seems to show to special advantage when used with ammonium sulfate. Other useful salts include anhydous sodium sulfate, potassium chloride and sulfate, lithium chloride and the like.

The amount of inert salt used in such a process is within the teachings of the prior art, i.e., at least about 4 parts per part of pigment being milled. More often the amount of inert salt is in the range of about 8 to 15 parts per part of pigment. The amount of $AlCl_3$ used is small compared to the inert salt, varying within the range of about 2% to 10% of the salt. In terms of the pigment being milled, the AlCl$_3$ is never less than about 10% of the pigment and may vary upward to 50% or even 75% of the pigment especially in the presence of larger amounts of inert salt.

As shown in Example 14 hereinbelow, it is also possible to form the complex in liquid suspension by milling a mixture of the pigment and anhydrous aluminum chloride in the presence of chemically inert liquid diluent such as o-dichlorobenzene, trichlorobenzene, xylene, tetrachloroethylene, and the like which are illustrative of a class of hydrocarbons and chlorinated hydrocarbons boiling between 60–220° C. The amount of such diluent is important only as it is sufficient to provide a fluid mass in the mill.

While the above-mentioned liquid diluents are chemicaly inert in the processes of the invention, they can, as shown in some of the examples, act as phase-directing or crystallizing solvents. Tetrachloroethylene is a preferred solvent because of its relatively low cost and freedom from fire hazards. However, there is a wide choice of suitable crystallizing solvents. Broadly, any anhydrous organic solvent which is inert to AlCl$_3$ and which has a boiling point above the temperature likely to be encountered in the mill can be used. Hydrocarbons and chlorinated hydrocarbons which are especially suitable include, in addition to those mentioned in the preceding paragraph, such solvents as methyl chloroform, carbon tetrachloride, and kerosene.

The amount of the solvent in such a case should be at least about 10% of the weight of the pigment and must be less than that which gives any tendency of the milling charge to coalesce to a pastry mass. A practical range is about 10% to 40% of the weight of the pigment.

The presence of a surfacant during the milling step, as shown in some of the examples, is a convenience in obtaining optimum results, but it is not an essential part of the invention and good results can be obtained in its absence, as shown in other examples. The nature of such a surfactant is not critical, both non-ionic and cationic agents being useful. Typical useful agents include quaternary ammonium salts with at least one long chain alkyl group, sorbital esters of long chain fatty acids, various long chain sulfonate derivatives, especially those having also amino groups in the molecule, and the like. The amount of agent may vary from about 2–10% of the weight of the pigment, about 5% being preferred.

REGENERATING THE PIGMENT

The second step of a process of this invention consists of regenerating the pigment from the complex which is formed during the milling step. This is done by mixing the complex with an electron-donor solvent—that is, a liquid capable of donating electrons to aluminum chloride. In some cases, as shown in Examples 1–5 hereinbelow, this is done by the addition of water or dilute mineral acid as the electron-donor solvents. These liquids serve both to decompose the complex and dissolve any salt which is present as a grinding medium. Since the amount of AlCl$_3$ in these examples is insufficient for a complete conversion to the complex, the crystal phase of the resulting product is usually predominantly that of the original crude although it may also be partially converted to the less stable alpha phase by the milling step.

When larger amounts of aluminum chloride are used, it is preferred to decompose the complex by reacting with electron donor compounds less reactive than water such as alcohols, substituted amides and the like. Such liquids are water-soluble and include alcohols with up to 3 carbon atoms, as methanol and ethanol, substituted amides such as dimethyl formamide and dimethylacetamide as well as such liquids as dimethyl sulfoxide and tetramethylene sulfone. The choice of liquids often influences the crystal phase of the final product, the alcohols usually yielding the beta phase in the case of unsubstituted quinacridone while dimethyl formamide, dimethyl sulfoxide and the like, of higher solvency power, yield the gamma phase. Since these liquids do not generally dissolve all of the aluminum chloride or the inert salt when present, it is the usual practice to complete the extraction with water or dilute mineral acid.

Another electron donor medium for regenerating the pigment from the complex, which seems especially useful in obtaining beta phase quinacridone from the partial complex containing unsubstituted quinacridone and AlCl$_3$ alone, is a mixture of about 45% acetic acid and 55% water. This concentration of acetic acid in water is critical only for the control of phase and even for this may be varied over a considerable range.

WASHING AND RECOVERING THE PRODUCT

After the quinacridone pigment has been regenerated as above described, any water-soluble constituents associated with it are separated from it by washing them out with water, and the washed pigment is recovered as by filtering it off and drying. The water-soluble constituents can consist of the aluminum chloride from which the quinacridone has been regenerated, as well as any inert salt residues from the grinding step.

It will be recognized that if the electron-donor solvent used for regenerating the pigment is water or an aqueous medium such as a dilute acid, the washing step can immediately follow and be integrally connected with the regeneration—in other words, the regeneration and at least the initial washing can be done with the same aqueous medium. Generally it is preferable even in such cases to wash the product further, until free of soluble materials.

The recovery of the final product will be governed by considerations already known to the art. Care is used, for example, to avoid drying at temperatures high enough to cause sintering or agglomerating of the finely divided pigment product.

SPECIFIC EMBODIMENTS

In one preferred process of this invention, a relatively small amount of anhydrous aluminum chloride is added to the inert salt used in a process similar to that shown in U.S. Patent 3,030,370 for the particle size reduction of quinacridone except that it is preferred to use ammonium sulfate as the inert salt instead of the aluminum sulfate of U.S. Patent 3,030,370. More specifically, a suitable ball mill is charged with a mixture of quinacridone, ammonium sulfate and aluminum chloride in the ratio of about 8:50:2 together with a small amount of a phase-directing solvent and milling is carried out in a conventional manner for a cycle of any desired length, preferably 6 to 12 hours. The product is readily discharged from the mill and subsequently extracted in dilute aqueous acid to leave the quinacridone pigment of excellent quality.

In another valuable embodiment of this invention larger amounts of anhydrous aluminum chloride may be used together with the inert salt such as sodium chloride in the formation of the complex and the pigment regenerated therefrom by reaction with a suitable organic liquid such as methanol or dimethyl formamide and subsequent extraction with water.

In another specific aspect, the pigment is milled alone with anhydrous aluminum chloride to form a complex which is decomposed with a solution of acetic acid in water or with an alcohol.

In still another embodiment, the pigment is milled with anhydrous aluminum chloride in suspension in an inert liquid such as o-dichlorobenzene to form the complex in suspension which is then decomposed by reaction with methanol, for instance, and the inert liquid separated from the pigment which is extracted with water.

Although the specific examples hereinbelow given are particularly concerned with particle size reduction of unsubstituted quinacridone in its various crystal phases, it has also been shown that the milling of suitable mixtures of quinacridone with quinacridonequinone or with substituted quinacridones has resulted in the formation of solid solutions. The invention is equally applicable to the particle size reduction of substituted quinacridones and pigments of related chemical structure. Such products to which this invention is applicable include 4,11-dichloroquinacridone, 2,9-dichloroquinacridone, the corresponding difluoro-, dimethyl-, and dimethoxy-substituted quinacridones, as well as quinacridonequinone and its corresponding substituted derivatives. It is also applicable to particle size reduction of isoquinacridone and its substituted derivatives and, in an even broader sense, to other nitrogen-containing heterocyclic pigmentary compounds which readily react with aluminum chloride to form a complex.

IMPROVEMENTS EFFECTED BY THE INVENTION

The presence of $AlCl_3$ in the milling charge described above offers several advantages. The required time for effective milling to achieve the desired particle size reduction is appreciably less than in the absence of the $AlCl_3$. It also facilitates control of the hue of the final pigment, in that particle size reduction is more readily obtained without undesired conversion to a mixture of crystal phases. Furthermore, the combination of at least a partial formation of a quinacridone/$AlCl_3$ complex with a selected method of regeneration of the pigments offers a powerful tool for the direction of the crystal phase in the final product of small particle size.

In the case of dry milling, there is a most unexpected advantage in the nature of the mill powder and its ease of discharge from the mill. Ball mills, such as are used in this process, are discharged through a relatively small opening covered by a screen. There is alway some material retained, but it is desirable that this retained material be at a minimum both for efficiency of operation and to prevent overgrinding during a subsequent cycle. When either sodium chloride or ammonium sulfate is used alone as the grinding aid, the powder adheres badly to the mill and the grinding balls, so that discharge is slow and the retained material after any reasonable discharge cycle is 10% or more of the charge. Now in processes of the present invention it has been found that the addition of the small amount of $AlCl_3$ results in mill powders which do not adhere to the mill or the grinding aids and which are relatively free flowing powders so that they are readily discharged from the mill in a short time to give about 95% recovery of the total charge.

EXAMPLES

The invention will be better understood by reference to the following illustrative examples. Unless otherwise stated, "parts" refers to parts by weight.

*Example 1*

A ball mill with an internal diameter of about 24" and a total capacity of about 60 gallons is charged with 1000 lbs. of cylindrical bars of iron approximately ½" x 1". An 8 lb. portion (1 part) of crude β-phase quinacridone (made by a process of U.S. Patent 2,969,366) is then charged to the ball mill, together with 50 lbs. (6.25 parts) of dry ammonium sulfate (($NH_4)_2SO_4$), 1 lb. (0.125 part) anhydrous aluminum chloride, 2 lbs. (0.25 part) tetrachloroethylene and 0.4 lb. (0.05 part) of a surface active agent comprising an amine dodecylbenzene sulfonate. The mill is rotated at a speed of about 40 r.p.m. (about 74% of critical speed) for 18 hours. The contents of the mill are then discharged through a screen, which retains the grinding elements, whereby there is recovered 58 lbs. of a dark blue powder. This powder is then added to and thoroughly wet with about 1000 lbs. of a 5% solution of sulfuric acid, and the mixture is heated to boiling and boiled for about one hour. The pigment is isolated by filtering, washing free of soluble salts, and drying at about 60° C. to give a substantially quantitative yield of a very bluish-red powder.

When this pigment is tested by rubout on a Hoover muller in lithographic varnish (a well-known and conventional test for the tinctorial properties of colored pigments), it is found to be about 5% stronger and bluer in tint with a darker, bluer and more transparent masstone than a product made by the identical process except for the absence of the anhydrous aluminum chloride. A second notable advantage is found in the ease of discharge of the ball mill. Whereas in this example 58 lbs. of the mill charge is readily discharged from the mill, when the $AlCl_3$ is absent, only about 54.5 lbs. can be readily discharged. Increasing the amount of $AlCl_3$ to 2 lbs. gives a darker masstone at a given grinding cycle with some increase in strength but a further increase to 5 lbs. reverses the trend.

*Example 2*

To the ball mill described in Example 1 is charged 4.8 lbs. of crude gamma phase quinacridone, prepared by a process of U.S. Patent 3,007,930, 3.2 lbs. of 4,11-dichloroquinacridone (made according to the general process of U.S. Patent 2,821,529), 50 lbs. dry ammonium sulfate, 2 lbs. anhydrous aluminum chloride, 1.3 lbs. of tetrachloroethylene and 0.4 lb. of an amine dodecylbenzene sulfonate and the charge is milled for 15 hours at 60–70° C. When the milled product is discharged from the mill, 58 lbs. of powder is recovered, compared to about 54 lbs. from a similar charge milled in the absence of the $AlCl_3$. The powder is extracted in dilute acid as described in Example 1 to give a quantitative recovery of a brilliant scarlet pigment which exhibits a characteristic X-ray pattern different from the patterns of either of the components. The product is darker and more transparent in masstone than a product made in the absence of $AlCl_3$, and is stronger and bluer and much more readily dispersible than a product milled with a hydrate of aluminum sulfate instead of the ammonium sulfate-aluminum chloride combination.

*Example 3*

To the ball mill described in Example 1 is charged 8 lbs. crude gamma phase quinacridone (see U.S. Patent 3,007,930), 50 lbs. dry ammonium sulfate, 2 lbs. anhydrous aluminum chloride, 1.3 lbs. tetrachloroethylene, and 0.4 lb. hexadecyltrimethyl ammonium chloride, and the charge is milled for 6 hours at 60–70° C. On discharge from the mill there is achieved a very high recovery of solids which is characteristic of products milled in the presence of $AlCl_3$. The powder product is extracted in dilute acid (4% solution of $H_2SO_4$) at the boiling point and finally isolated by filtering, washing and drying to give a quantitative recovery of a gamma phase quinacridone pigment with a light, opaque masstone and a strong bluish tint. When the milling time is increased beyond about 6 hours, the masstone becomes darker and more transparent at a sacrifice in strength and blueness of tint. This is accompanied by some conversion to the alpha phase on long milling. It is thus possible to control the color within fairly wide limits by choosing the appropriate milling cycle.

*Example 4*

To the ball mill used in Example 1 is charged 8 lbs. of a crude quinacridone pigment comprising a mixture of about 65% quinacridone and 35% quinacridonequinone obtained by oxidation of dihydroquinacridone with nitrobenzene-m-sodium sulfonate in aqueous alkali, 50 lbs. dry ammonium sulfate, 2 lbs. anhydrous aluminum chloride, 2 lbs. tetrachloroethylene, and 0.8 lb. lignin sulfonate, and the charge is milled for the 16 hours at 60–70° C. The powder is discharged from the mill in high yield. It is extracted with dilute acid as shown in Example 1 to give a quantitative recovery of a maroon pigment which is darker in masstone than the same crude pigment after milling for a comparable cycle with hydrated aluminum sulfate. This pigment has a distinctive X-ray diffraction pattern which is different from the sum of the patterns of the components.

Example 5

To the ball mill used in Example 1 is charged 4.8 lbs. of gamma quinacridone, 3.2 lbs. of 2,9-dimethylquinacridone, 50 lbs. ammonium sulfate, 2 lbs. anhydrous aluminum chloride, 2 lbs. tetrachloroethylene, and 0.4 lb. hexadecyltrimethyl ammonium chloride, and the charge is milled for 10 hours at 60–70° C. The powder product is readily discharged from the mill in high yield. It is extracted with dilute acid to give a quantitative recovery of a purple powder which is more readily dispersible in a coating composition vehicle than a similar pigment milled with aluminum sulfate according to the teachings of U.S. Patent 3,030,370. Such a dispersion in a vehicle yields a coating composition with a very dark, purplish masstone and an intense magenta hue of excellent lightfastness.

Example 6

A mixture of 135 parts sodium chloride, 5 parts anhydrous aluminum chloride, 6 parts quinacridone, 4 parts quinacridonequinone, 4 parts tetrachloroethylene and 0.5 part of an amine dodecylbenzene sulfonate is charged to a ball mill of suitable dimensions already charged with a grinding aid consisting of ½″ steel balls and the mixture is milled for 4 days. The powder is discharged from the mill and extracted at the boil with 5% $H_2SO_4$ and finally filtered, washed and dried. There is obtained a quantitative yield of a maroon pigment which exhibits a characteristic X-ray pattern which is different from a mixture of the patterns of the two components. This is evidence that the components now form a solid solution with each other. If the aluminum chloride is omitted from the charge, the solid solution does not form and the X-ray pattern shows the lines of both components.

Example 7

Eight hundred parts of quinacridone is charged to a dry ball mill containing a charge of grinding elements consisting of cylindrical iron bars about ½″ x 1″, occupying about 40% of the volume of the mill, the mill being of such a size that the total charge of pigments and grinding elements occupies about 60–65% the volume of the mill. There is then added 200 parts of anhydrous aluminum chloride, and the mill rotated at about 70% of critical speed for about 18 hours, keeping the mill temperature in the range of about 60–70° C. The contents of the mill are then discharged in the conventional manner to recover at least 950 parts of a granular purplish solid. This product fumes to some extent in contact with moist air and is stored in non-metallic containers.

Example 8

Ninety parts of the dry product of Example 7 is added slowly with good agitation to a solution of 105 parts glacial acetic acid in 120 parts of water at 30–35° C. After stirring this mixture for about 15 minutes, a solution of 2.3 parts of a wetting agent comprising a high molecular weight aliphatic polyoxyethylene ether alcohol in 70 parts of water is added, followed by further stirring for about ½ hour, dilution with 250 parts of water and heating at 60° C. for 2 hours, and finally filtering, washing free of chloride ion, washing with dilute ammonia and again with water and drying at 60° C. The product is beta phase quinacridone of excellent pigment quality.

Example 9

Thirty parts of the quinacridone/$AlCl_3$ complex of Example 7 is added to 250 parts of methanol and the mixture is stirred at room temperature for 1.5 hours. It is then filtered, the cake washed with several small portions of methanol, and dried to give 22.5 parts of a dark reddish-violet, beta phase quinacridone.

Alternatively, the methanol slurry is diluted with about 1000 parts of 5% sulphuric acid, heated to the boil for 15–20 minutes, filtered, washed free of soluble salts and dried to give a similar yield of a product of similar characteristics.

Example 10

One thousand five hundred parts of ½″ steel balls and 150 parts of roofing nails are charged to a ball mill of such a size that it is about 40% filled. Then, 135 parts of dry crystalline sodium chloride, 15 parts of dry crude linear quinacridone pigment and 10 parts of anhydrous aluminum chloride are charged to the mill and the complete charge is milled for about 18 hours at about 70% of critical speed with the temperature maintained below about 60° C. The powder is discharged from the mill and stirred into 160 parts of methanol and then stirred for about ½ hour after which about 2000 parts of water are added and the mixture boiled for ½ hour, filtered, washed free of soluble salts and dried at 60° C. It is desirable to remove any fragments of iron from the mills prior to filtration by passing the slurry over a magnet. The resulting product is a beta phase quinacridone with a dark, transparent masstone and high pigment strength. It is a valuable violet shade pigment. The methanol in this example can be replaced with other water soluble alcohols such as ethanol, propanol, isopropanol, ethyleneglycol and the like.

Example 11

Milling of a linear quinacridone pigment in the presence of sodium chloride and anhydrous aluminum chloride is done as in the preceding Example 10. The powder discharge from the mill is stirred into 160 parts of dimethyl formamide, stirred for about ½ hour, diluted with about 2000 parts of water, and boiled for ½ hour. It is then filtered, washed, and dried to give a bluish-red, gamma phase quinacridone pigment with a transparent masstone and excellent color strength. The dimethyl formamide can be replaced in this example with dimethyl sulfoxide, dimethylacetamide, tetramethylene sulfone, and other high solvency organic liquids.

Example 12

Nine parts of crude gamma phase quinacridone and 6 parts of 4,11-dichloroquinacridone are milled together with 135 parts of dry sodium chloride and 10 parts of anhydrous aluminum chloride for about 18 hours in the mill described in Example 10 above. After discharge from the mill, the powder is wet up with 160 parts of dimethyl formamide, stirred for about ½ hour, diluted with 2000 parts of water, boiled for ½ hour, filtered, washed, and dried, to give a brilliant scarlet pigment of excellent tinctorial strength. This pigment exhibits a characteristic X-ray diffraction pattern different from the pattern of either of its components and is considered to be a solid solution.

Example 13

Nine parts of crude gamma phase quinacridone and 6 parts of 2,9-dimethylquinacridone are milled together with 135 parts of dry sodium chloride and 10 parts of anhydrous aluminum chloride for about 18 hours in the mill described in Example 10 above. The powder discharged from the mill is wet up with 160 parts of dimethyl formamide, stirred for about ½ hour, diluted with 2000 parts of water, boiled ½ hour, filtered, washed, and dried to give a brilliant magnetic pigment of excellent tinctorial strength and excellent lightfastness. This pigment exhibits a characteristic X-ray diffraction pattern which is different from a pattern of a physical mixture of the two components; hence the product is believed to be a solid solution.

Example 14

Fifteen parts of crude gamma phase quinacridone and 8 parts of anhydrous aluminum chloride are charged to a ball mill of suitable dimensions containing 155 parts of o-dichlorobenzene and a conventional charge of steel balls. The charge is milled for about 12 hours and then diluted with additional o-dichlorobenzene to facilitate discharge from the mill. One hundred parts of dimethyl formamide is added to the slurry. The mixture is stirred vigorously for ½ hour and then filtered to remove most of the o-dichlorobenzene. The filter cake is then slurried in about 2000 parts of water and the residual o-dichlorobenzene removed by steam distillation, after which the slurry is filtered, washed free of soluble salts and dried to give a bluish-red pigment which is identified by its X-ray pattern and its tinctorial properties as gamma phase quinacridone in small particle size.

If the dimethyl formamide in this example is replaced by methanol, the resulting product is a violet pigment which is identified in like manner by its X-ray pattern and its tinctorial properties as beta phase quinacridone in small particle size.

We claim:

1. A process for improving the pigment properties of a quinacridone comprising (1) milling the quinacridone with anhydrous aluminum chloride to effect chemical association therewith, (2) regenerating the quinacridone by mixing the product from said milling step with a liquid electron-donor solvent selected from the group consisting of water, dilute mineral acids, acetic acid-water mixtures, alcohols with up to 3 carbon atoms, N-alkyl substituted amides, alkyl sulfoxides and alkyl sulfones, the alkyl substituents containing up to 3 carbon atoms, (3) separating water-soluble constituents from the quinacridone by washing them out with water, and (4) recovering the quinacridone.

2. In a process for reducing the particle size of a quinacridone pigment the steps comprising (1) milling the quinacridone with anhydrous aluminum chloride under anhydrous conditions whereby a complex compound of the quinacridone with the aluminum chloride is formed, (2) regenerating the quinacridone from the complex compound by mixing said compound with a liquid electron-donor solvent selected from the group consisting of water, dilute mineral acids, acetic acid-water mixtures, alcohols with up to 3 carbon atoms, N-alkyl substituted amides, alkyl sulfoxides and alkyl sulfones, the alkyl substituents containing up to 3 carbon atoms, whereby reaction occurs between the compound and solvent with liberation of the quinacridone in smaller-than-original particle size, (3) separating water-soluble constituents from the quinacridone by washing them out with water, and (4) recovering the quinacridone.

3. A process of claim 2 in which there is present in the grinding mixture during the milling step from 10 to 40 percent by weight, based on the quinacridone, of a crystallizing solvent selected from the group consisting of o-dichlorobenzene, trichlorobenzene, xylene, tetrachloroethylene, methyl chloroform, carbon tetrachloride, and kerosene.

4. A process of claim 2 in which the electron-donor solvent is aqueous acetic acid.

5. A process of claim 2 in which the electron-donor solvent is an alcohol with up to 3 carbon atoms.

6. A process of claim 2 in which the electron-donor solvent is dimethyl formamide.

7. In a process for reducing the particle size of a quinacridone pigment the steps comprising (1) milling the quinacridone under anhydrous conditions with a mixture comprising a minor proportion of a anhydrous aluminum chloride and a major proportion of an inert, water-soluble, crystalline, inorganic salt, whereby a complex compound of the quinacridone with the aluminum chloride is formed, (2) regenerating the quinacridone from the complex compound by mixing said compound with a liquid electron-donor solvent selected from the group consisting of water, dilute mineral acids, acetic acid-water mixtures, alcohols with up to 3 carbon atoms, N-alkyl substituted amides, alkyl sulfoxides and alkyl sulfones, the alkyl substituents containing up to 3 carbon atoms, whereby reaction occurs between the compound and solvent with liberation of the quinacridone in smaller-than-original particle size, (3) separating water-soluble constituents from the quinacridone by washing them out with water, and (4) recovering the quinacridone.

8. A process of claim 7 wherein the inert salt is anhydrous ammonium sulfate.

9. A process of claim 7 in which the electron-donor solvent is an alcohol with up to 3 carbon atoms.

10. A process of claim 7 in which the electron-donor solvent is an N-alkyl substituted amide, the alkyl substituent containing up to 3 carbon atoms.

References Cited in the file of this patent

UNITED STATES PATENTS

| | | |
|---|---|---|
| 2,833,783 | Ehrich et al. | May 6, 1958 |
| 3,020,279 | Woodlock et al. | Feb. 6, 1962 |
| 3,030,370 | Jackson | Apr. 17, 1962 |

OTHER REFERENCES

Noller: Chemistry of Organic Compounds, 2d ed., pages 235–236 (1958).